United States Patent [19]

Mowery et al.

[11] Patent Number: 5,278,897
[45] Date of Patent: Jan. 11, 1994

[54] SMART INTERNODAL TRANSFER FOR SUBSCRIBER ACCESS IN MULTINODE VOICE MESSAGING SYSTEMS

[75] Inventors: Faye Mowery, San Jose; Jeffrey M. Blohm, Sunnyvale; Thomas R. Schmidt, Mountain View, all of Calif.

[73] Assignee: ROLM Company, Santa Clara, Calif.

[21] Appl. No.: 847,777

[22] Filed: Mar. 9, 1992

[51] Int. Cl.[5] .................... H04M 3/42; H04M 1/64; H04M 7/00
[52] U.S. Cl. .................... 379/212; 379/67; 379/207; 379/230
[58] Field of Search .................... 379/67, 84, 88, 89, 379/210, 211, 212, 201, 207, 230, 93

[56] References Cited

U.S. PATENT DOCUMENTS

| | | | |
|---|---|---|---|
| 4,602,129 | 7/1986 | Matthews et al. | 379/88 |
| 4,612,416 | 9/1986 | Emerson et al. | 379/89 X |
| 4,790,003 | 12/1988 | Kepley et al. | 379/88 |
| 4,933,967 | 6/1990 | Lo et al. | 379/89 |

*Primary Examiner*—James L. Dwyer
*Assistant Examiner*—Harry S. Hong
*Attorney, Agent, or Firm*—Michael B. Einschlag

[57] ABSTRACT

Method for providing smart, internodal transfer for subscriber access which enables a subscriber who inputs a subscriber access number at a node in a multinode voice messaging system which is different from the subscriber's home node, i.e., the node which supports the subscriber's personal mailbox, to perform the subscriber's personal mailbox transactions without having to place a second call to reach the home node and without having to re-enter mailbox identification and password information once the home node is reached. An embodiment of the invention includes the steps of: (a) identifying calls received at a node which is not the home node, the home node being the node which supports a personal mailbox session requested by the subscriber; (b) transferring information relating to the call such as subscriber mailbox identification and subscriber access type to the home node via a data path; (c) transferring the subscriber call to the home node; and (d) identifying calls received at the home node by such step of transferring to continue the subscriber's personal mailbox access session.

5 Claims, 1 Drawing Sheet

SMART INTERNODAL TRANSFER FOR SUBSCRIBER ACCESS IN MULTINODE VOICE MESSAGING SYSTEMS

TECHNICAL FIELD OF THE INVENTION

The present invention relates to a method for providing a single subscriber access number to obtain personal mailbox service in a multinode voice messaging system.

BACKGROUND OF THE INVENTION

Some voice messaging systems are presently fabricated in the form of multinode voice messaging systems. A multinode voice messaging system is a voice messaging system which is comprised of two or more nodes, each node comprising a voice messaging system and each node having some information concerning the activities of the other nodes in the system via information exchange among the nodes. As is well known to those of ordinary skill in the art, such information exchange occurs over data paths, examples of which data paths include a voice path control message link between nodes or a communication network link such as, but not limited to, a local area network (LAN). Such data paths provide means for exchange of data which is used in coordinating voice messaging activities in the multinode system.

Voice messaging systems typically utilize a logical entity which is referred to as a personal mailbox. The personal mailbox provides logical access to a set of messages which are identified with an owner of the mailbox, i.e., private messages. In addition, in a typical voice messaging system, the personal mailbox provides messaging facilities such as, for example, storage, playback, creation, deletion and transmittal of messages. The method which is utilized by subscribers to a multinode voice messaging system to obtain access to a personal mailbox is referred to as subscriber access.

In one multinode voice messaging system which is known in the prior art, each node in the multinode voice messaging system uses a distinct subscriber access number for providing subscriber access. In such a system, whenever a subscriber utilizes an incorrect subscriber access number, i.e., a subscriber access number for a node other than that assigned to the personal mailbox for the subscriber, the system will not give the subscriber access to the subscriber's personal mailbox. However, the subscriber is informed of the problem, for example, via a voice message such as: "This node cannot provide access to your mailbox; you must input the subscriber access number for the home node to which you are connected."

In another multinode voice messaging system which could be engineered using the prior art, whenever a subscriber enters a subscriber access number to a node which does not support the subscriber's personal mailbox, the subscriber is transferred to the node which does support the subscriber's personal mailbox and such transfer occurs after the process of subscriber identification/password verification is completed. However, in such a system, after the transfer is complete, the dialog between the subscriber and the correct node starts at the beginning of a subscriber session, i.e., the subscriber must repeat the subscriber identification/password verification process as if it were a new call.

As a result, in such prior art multinode voice messaging systems, subscribers are inconvenienced whenever they input an incorrect subscriber access number by being blocked from access to a personal mailbox or by having to re-enter identification/password data.

In addition to the above-described drawbacks of requiring subscribers to use node-specific subscriber access numbers to access personal mailbox functions in a multinode voice messaging system, the need to require node-specific and even function-specific subscriber access numbers has a further drawback. The further drawback is that coordination of a large number of access numbers becomes a substantial administrative burden.

In light of the above, there is a need in the art for a method of providing a subscriber access to a multinode voice messaging system which enables a subscriber who inputs a subscriber access number at a node in the multinode voice messaging system, which node is different from a home node, i.e., the node which supports the subscriber's personal mailbox, to perform the subscriber's personal mailbox transactions without having to place a second call to reach the home node and without having to re-enter mailbox identification and password information once the home node is reached.

SUMMARY OF THE INVENTION

Embodiments of the present invention advantageously satisfy the above-described need in the art by providing smart internodal transfer for subscriber access which enables a subscriber who inputs a subscriber access number at a node in a multinode voice messaging system, which node is different from a home node, i.e., the node which supports the subscriber's personal mailbox, to perform the subscriber's personal mailbox transactions without having to place a second call to reach the home node and without having to re-enter mailbox identification and password information once the home node is reached.

An embodiment of the present invention comprises the steps of: (a) identifying calls received at a node which is not the home node, the home node being the node which supports a personal mailbox session requested by a subscriber; (b) transferring information relating to the call to the home node, such information comprising, for example, the fact of subscriber password validation (this can be transmitted implicitly since there would be no transfer for a subscriber who did not provide proper a password), subscriber mailbox identification, and the subscriber access type; (c) transferring the subscriber call to the home node; and (d) identifying calls received at the home node by such step of transferring to continue the subscriber's personal mailbox access session.

The invention will be better understood from the following more detailed description taken with the accompanying drawing and claims.

BRIEF DESCRIPTION OF THE DRAWINGS

Corresponding elements in each of the drawings have the same reference numbers.

DETAILED DESCRIPTION

Figure 1:
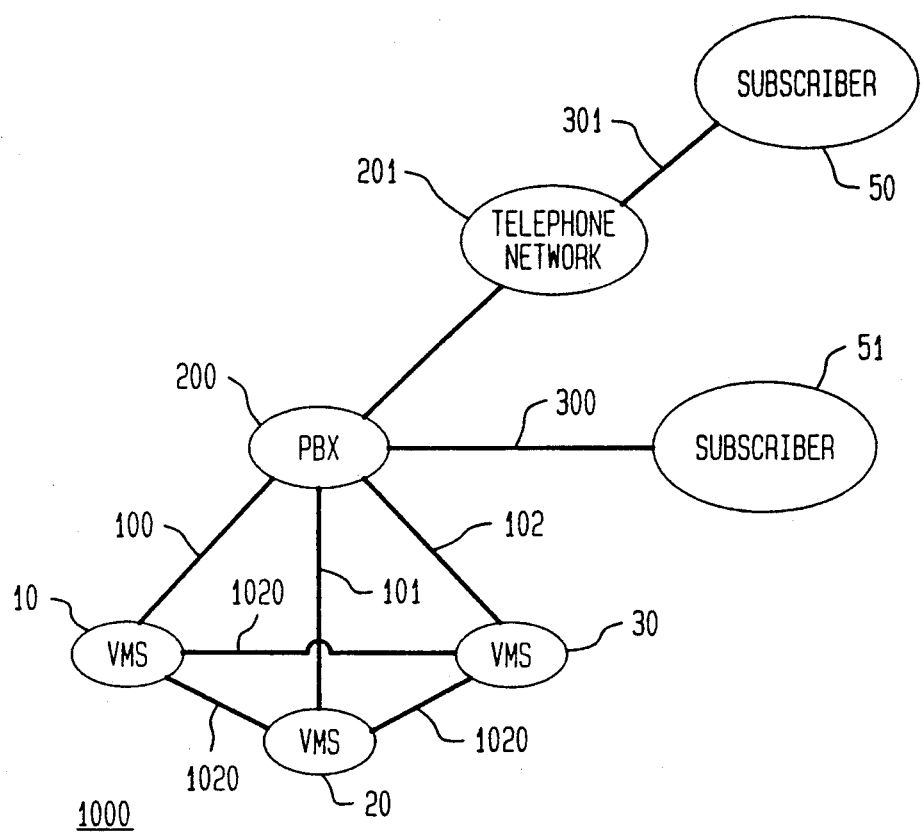
FIG. 1 shows a block diagram of a multinode voice messaging system which utilizes an embodiment of the present invention for providing smart, internodal subscriber access call transfer in the multinode voice messaging system.

In accordance with the present invention, a multinode voice messaging system provides subscriber access independent of which voice messaging node actually receives a subscriber call and independent of which voice messaging node provides personal mailbox service to the subscriber. As is well known to those of ordinary skill in the art, each node in the multinode voice messaging system has access to a data base, whether a local data base which is associated with each node or a centralized data base which is can be accessed by each node. This data base provides information which is used, among other things: (a) to determine whether the accessed node is the home node for the subscriber; (b) to provide password validation for the system; and (c) to provide subscriber information such as subscriber mailbox information and subscriber access type. The home node is the node which supports the personal mailbox addressed by the subscriber.

In accordance with the present invention, an embodiment of the inventive multinode voice messaging system: (a) identifies calls received at a node which is not the home node; (b) transfers information relating to the call to the home node via a data path (in the preferred embodiment of the present invention the data path may be also serve as a voice path), such information comprising, for example, the fact of subscriber password validation (this can be transmitted implicitly since there would be no transfer for a subscriber who did not provide proper a password), subscriber mailbox identification, and the subscriber access type; (c) transfers the subscriber call to the home node; and (d) identifies calls received at the home node by means of such transfer in order to continue the subscriber's personal mailbox access session.

FIG. 1 shows a block diagram of a multinode voice messaging system which utilizes an embodiment of the present invention for providing smart internodal subscriber access call transfer in the multinode voice messaging system. Apparatus 1000 is a multinode voice messaging system comprised of voice messaging nodes VMS 10, VMS 20 and VMS 30. Data path 1020 transmits data among VMS 10, VMS 20, and VMS 30. In the preferred embodiment of the present invention, data path 1020 comprises a local area network (LAN), which LAN is well known to those of ordinary skill in the art. Further, this data path can be used to transmit data as well as voice in the form of data. In the preferred embodiment, as will be explained in further detail below, these data paths are utilized to transmit control messages among the nodes.

As shown in FIG. 1, private business exchange 200 (PBX 200) provides: (a) an interface between VMS nodes 10, 20, and 30; (b) an interface between subscriber 51 and VMS nodes 10, 20, and 30; and (c) an interface between subscriber 50 and VMS nodes 10, 20, and 30 through public telephone network 201. In the preferred embodiment of the present invention, PBX 200 is ROLM Systems CBX 9751 manufactured by ROLM Systems of Santa Clara, California and VMS 10, 20, and 30 are each a ROLM Systems PhoneMail system also manufactured by ROLM Systems of Santa Clara, California. In the preferred embodiment, a protocol developed by ROLM Systems, i.e., the Rolm Telephony Application Protocol (TAP), provides a call processing link from PBX 200 to each of VMS 10, 20, and 30 for: (a) a subscriber access call received from subscriber 50; (b) a subscriber access call received from subscriber 51; and (c) call transfer from one of VMS 10, 20, and 30 to another one of VMS 10, 20, and 30. Communication among VMS 10, 20, and 30 nodes for transfer of control information which is required for providing smart, internode call transfer in accordance with the present invention is obtained in the preferred embodiment utilizing a Token Ring Network Protocol of IBM which is well known to those of ordinary skill in the art.

In accordance with the present invention, PBX 200 can transfer a call placed to one of VMS 10, 20, or 30 to another one of VMS 10, 20, or 30 upon request of the one of VMS 10, 20, Or 30. The transfer request is placed utilizing the TAP. For example, in the preferred embodiment, VMS 10 communicates a service request for a transfer function to PBX 200, using the TAP message protocol, in order to transfer a caller connected to VMS 10 to his/her home node, for example, VMS 20. The TAP protocol provides a service response from PBX 200 to VMS 10 acknowledging the service request and indicating transfer completion status. Thus, advantageously, smart internodal transfer for subscriber access utilizes the call transfer service provided by the TAP protocol.

In accordance with the present invention, whenever a call is received by one of VMS 10, 20, or 30, the node obtains the subscriber's identification and password. The node performs validation of the password and determines whether the node is the home node for the subscriber by utilizing information in a data base. In accordance with the present invention, the data base may be a local data base for each node or the data base may be a central data base which is accessed by each node. If the node is not the home node for the subscriber, the data base supplies a smart internodal transfer access number of the home node for use in transferring the call to the home node. The node transfers the call to the home node by requesting a call transfer from PBX 200 using the unique smart internodal transfer access number of the subscriber's home node. Further, the call transfer is made by causing the Called Party ID in the call transfer request to be the unique smart internodal transfer access number of the home node. When the call is received at the home node, the home node recognizes the transfer as being a smart internodal transfer because the Called Party ID matches the home node smart internode transfer access number.

In addition to merely transferring the call to the home node, smart internodal transfer in accordance with the present invention requires call transfer, as described above, the transmittal of information relating to the call from the call receiving node to the home node, and the coordination of the call transfer and the information transmittal. In accordance with the preferred embodiment of the present invention, information transmittal is accomplished over data paths 1020 and 2030 which are configured as a LAN. Further, in order to provide the required coordination, the information transmittal must include the calling party telephone number. This information is used to provide coordination whenever: (a) an incoming call is identified as a smart internodal transfer for subscriber access in the manner described above and (b) the calling party telephone number of the call which is being transferred matches the calling party telephone number transmitted to the home node over the LAN. Then, when these two events occur, the home node, i.e., the appropriate of VMS 10, 20, or 30, connects the transferred call to a subscriber session application in the home node. Further, in accordance with the present information, the data transmitted via the token ring LAN to the home node includes the fact of password validation, in the preferred embodiment this is provided implicitly by the fact of the transfer, subscriber mailbox information, and subscriber access type. Because of the information received, advantageously, the subscriber does not have to repeat the process of providing identification and password validation.

As those of ordinary skill in the art will readily appreciate, one method for coordinating transmittal of information, referred to below as call context data, between the called node and the home node with call transfer between the called node and the home node is: (a) first, transmitting the call context data from the accessed node to the home node over the LAN; (b) second, transmitting a confirmation of receipt of the call context data from the home node to the accessed node; and (b) next, initiating a call transfer from the accessed node to the home node through PBX 200. However, one must take into account that the home node may lack the resources for effecting an immediate call transfer. It can be seen that one consequence of this embodiment of the present invention is that the subscriber may receive a faster response when lack of resources prevents successful completion of the call transfer because the home node both reserves an incoming node channel via the token ring LAN connection 1020 and establishes exclusive mailbox access at the home node, all upon receipt of the call context data from the accessed node and prior to transmitting a confirmation to the home node of receipt of the call context data. (A channel refers to a communication link between a node and PBX 200 which can be used to receive a telephone call.) In this embodiment, the above implies that if the subscriber mailbox is busy or if no channel is available at the home node, the home node will return a negative indication to the accessed node in response to the transmission of call context data therefrom. If a negative indication is returned to the accessed node which sent the call context data, the accessed node will not attempt a call transfer and the subscriber access call will remain at the accessed node. In particular, this means, in the preferred embodiment, that the accessed node will transmit a message to the subscriber which informs the subscriber that a no channel available condition exists with respect to access to the home node.

In a further embodiment, the time perceived by the calling subscriber to have access to the home node can be minimized by having the accessed node send call context data to the home node and, while the accessed node is waiting for a response indication from the home node, the accessed will transmit a "comfort" message to the subscriber such as, for example, "Please hold."

In order to effectuate smart internodal transfer, each node must know the smart internodal transfer access number of all other nodes and such numbers have to be broadcast whenever a number changes. Advantageously, in the preferred embodiment, whenever a home node sends a response indicating the transfer can proceed to an accessed mode, the home node includes its smart internodal transfer access number along with the response. Since each node knows its own smart internodal transfer access number, this method obviates the need to broadcast a smart internodal transfer access number whenever the number changes.

The following describes a call scenario which illustrates the manner in which an embodiment of the present invention operates. First, VMS node 10 receives an incoming telephone call from subscriber 51. The telephone call is presented to VMS 10 from PBX 200 utilizing the TAP. VMS 10 receives information which provides: (a) the call type, i.e., subscriber access; (b) the identity of the calling party, for example, extension 111; and (c) the identity of the called party, for example, the subscriber access extension. In response, VMS 10 prompts the calling subscriber to input his/her mailbox number and password. In response, the calling subscriber inputs his/her mailbox number, for example, mailbox 1234, using a touchtone pad on his/her telephone and his/her password, for example, password 3344. VMS 10 validates the password and, by accessing a data base (not shown) determines that the home node for mailbox 1234 is VMS 20. Those of ordinary skill in the art will readily appreciate that the database may be a local database for VMS 10 or it may be a centralized database that can be accessed by each the nodes of apparatus 1000 by any one of a multiplicity of means such as, for example, by separate data access.

Next, VMS 10 having determined that the subscriber access refers to VMS 20, VMS 10 transmits call context data to VMS 20 over LAN data path 1020. In the preferred embodiment, the call context data comprises: smart internodal transfer access number of VMS 20; an indication of message type; calling party identification, i.e., extension 111; and mailbox number, i.e., mailbox 1234. The receipt of a valid password is a pre-condition to transmitting call context data, thus, it is implied and not sent.

VMS 20 receives the call context data over LAN data path 1020 and recognizes that an incoming call will be transferred thereto from VMS 10. In response, VMS 20 reserves a channel on call path 101 for receiving the call from the subscriber. Then, VMS 20 "opens" mailbox 1234 in the logical sense, in a manner which is well known to those of ordinary skill in the art. Next VMS 20 saves the mailbox number, the extension, and the channel number and VMS 20 transmits a positive response indication to VMS 10 over LAN data path 1020. Finally, VMS 20 waits for the call to be transferred thereto from VMS 10 by PBX 200.

VMS 10 receives the response indication from VMS 20. If the response indication is positive, VMS 10 causes PBX 200 to transfer the call to VMS 20 utilizing TAP. This transfer utilizes the smart internodal transfer access number of VMS 20 which is obtained from the data base. Then, VMS 10 terminates the call at VMS 10. However, if VMS 10 receives a negative indication from VMS 20, VMS 10 transmits a prompt to the calling subscriber that he/she cannot access the mailbox because, for example, no channel is available at his/her home node. Then, it is possible that VMS 10 could reattempt the transfer at a predetermined later time.

VMS 20 receives the incoming call transfer from PBX 200 utilizing TAP. PBX 200 determines that the called party identification is the smart internodal transfer access number of VMS 20. VMS 20 then verifies that the calling party identification matches the calling party identification it received over LAN data path 1020. Then, VMS 20 causes the incoming call to be connected to the reserved channel utilizing TAP. Finally, VMS 20 enters an application program for a subscriber access session, which application programs are well known to those of ordinary skill in the art, at a point which skips password validation.

It is to be appreciated and understood that the specific embodiments of the invention described hereinbefore are merely illustrative of the general principles of the invention. Various modifications may be made by those skilled in the art consistent with the principles set forth hereinbefore.

What is claimed is:

1. A method for transferring a subscriber to a multinode voice mail system who accesses a node which is different from the subscriber's home node, i.e., a node which supports the subscriber's personal mailbox, to the subscriber's home node, which method comprises the steps of:

receiving a telephone call from a subscriber to the voice mail system at a node and initiating a subscriber personal mailbox access session;

identifying a telephone call from a subscriber which is received at the node which is not the home node as being received from a subscriber having a home node which differs from the node;

transferring information relating to the subscriber and to the telephone call to the home node via a data path;

transferring the telephone call to a smart internodal access transfer number at the home node; and identifying the transferred telephone call received at the home node by matching a portion of the information transferred via the data path and information supplied with the transferred telephone call and utilizing the information transferred via the data path for continuing the subscriber personal mailbox access session.

2. The method of claim 1 wherein the information transferred via the data path comprises subscriber mailbox identification and subscriber access type.

3. The method of claim 1 wherein the information supplied with the transferred telephone call comprises the calling subscriber's telephone number.

4. The method of claim 3 which further comprises the step of, after the step of transferring the information, attempting to reserve a channel at the home node for receiving the transferred telephone call.

5. The method of claim 4 which further comprises the steps of, after the step of attempting to reserve a channel, transferring an acknowledgment of receipt of the information transferred via the data path from the home node to the node; and the node sending a message to the subscriber after the acknowledgment, if a channel has not been reserved.

* * * * *